United States Patent
Matsumura et al.

(10) Patent No.: US 8,612,675 B2
(45) Date of Patent: Dec. 17, 2013

(54) STORAGE CONTROLLER AND FIRMWARE UPDATING METHOD

(75) Inventors: Tadashi Matsumura, Kawasaki (JP); Masahiro Yoshida, Kawasaki (JP); Taichi Ohno, Matsuyama (JP); Akihito Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1084 days.

(21) Appl. No.: 12/198,740

(22) Filed: Aug. 26, 2008

(65) Prior Publication Data

US 2009/0063766 A1  Mar. 5, 2009

(30) Foreign Application Priority Data

Aug. 29, 2007  (JP) ................. 2007-223102

(51) Int. Cl.
*G06F 12/00* (2006.01)
*G06F 13/00* (2006.01)
*G06F 13/28* (2006.01)

(52) U.S. Cl.
USPC ...................................... 711/113

(58) Field of Classification Search
USPC ........................................ 711/113
See application file for complete search history.

(56) References Cited

U.S. PATENT DOCUMENTS 7,073,017 B2 * 7/2006 Yamamoto ............... 711/103
2003/0212864 A1 * 11/2003 Hicken et al. .............. 711/122

FOREIGN PATENT DOCUMENTS

| JP | 2003-131897 | 5/2003 |
| JP | 2005-165528 | 6/2005 |
| JP | 2006-134149 | 5/2006 |

* cited by examiner

*Primary Examiner* — Alford W. Kindred
*Assistant Examiner* — Criag Goldschmidt
(74) *Attorney, Agent, or Firm* — Staas & Halsey LLP

(57) ABSTRACT

A storage controller and method are provided. The storage controller includes control sections including storage sections into which data transmitted from a host unit is cached, one of the control sections being a main control section which controls firmware update in the control sections. The main control section includes an instruction updater sending an update instruction to a sub control section in the control sections in which firmware is to be updated, and an area instructor requesting the sub control section to transmit area information, the sub control section including an area information obtainer obtaining, according to the instruction from the area instructor and an area information transmitter transmitting to the area instructor; and an area setter setting the location of the cache area in the storage section on the basis of the instruction.

11 Claims, 20 Drawing Sheets

STORAGE CONTROLLER AND FIRMWARE UPDATING METHOD

CROSS-REFERENCE TO RELATED APPLICATIONS

This application is related to and claims priority to Application No. 2007-223102, filed on Aug. 29, 2007 in the Japan Patent Office, the entire contents of which are incorporated by reference herein.

BACKGROUND

1. Field

The embodiments discussed herein are directed to a storage controller and a firmware updating method and, more particularly, to a storage controller and a firmware updating method allowing cache data mirroring to be accomplished even during firmware update.

2. Description of the Related Art

In some of storage units such as disk array units, redundancy is provided in the internal construction to improve the reliability. For example, conventionally in a disk array unit redundancy may be provided in components including a channel adapter which is an interface for connection to a host computer and a central processing section for controlling input/output processing. The disk array unit may also have the function of duplicately holding cache data stored in a memory of one of two central processing sections by mirroring the cache data to a memory of the other central processing section for the purpose of improving the reliability of data.

Although a storage unit, which performs cache data mirroring for improving the reliability of data, can continue to operate at the time of firmware update, it has a problem of considerable reduction in performance. This is because operation in a write-back mode in which write to a disk is performed asynchronously with the operation of a host computer cannot be performed during firmware update, and operation in a write-through mode inferior in performance than the write-back mode must be performed during firmware update.

During firmware update, redundant structures such as central processing sections have different versions of firmware. Therefore, one line of the redundant structures which has been updated and another line which has not been updated may have different locations on memories allocated to the areas where cache data is stored. If cache data mirroring is performed when such an inconsistency exists between the areas, a serious fault such as area destruction may occur. In conventional storage systems, therefore, cache data mirroring is stopped during firmware update.

In a state where cache data mirroring is not being performed, cache data which has not been written to a disk is not sufficiently protected. If a serious fault occurs in the line whose cache data is held in a memory, the data may be lost. During firmware update, therefore, conventional storage systems can only be operated in the write-through mode in which write to a disk is immediately performed at a write request.

SUMMARY

It is an aspect of an example embodiments discussed herein to provide a storage controller having a plurality of control sections including storage sections into which data transmitted from a host unit is cached, one of the control sections being a main control section which controls firmware update in the control sections, the main control section having an instruction updater sending an update instruction to a sub control section in the control sections in which firmware is to be updated, and an area instructor requesting the sub control section to transmit area information indicating the location of a cache area in the storage section in which a cache is held after the completion of updating of the firmware in the sub control section, and providing an instruction to set the location of the cache area on the basis of the transmitted area information, the sub control section having an area information obtainer obtaining, according to the instruction from the an area instructor, area information indicating the location of the cache area in the storage section, an area information transmitter transmitting to the an area instructor the area information obtained by the an area information obtainer, and an area setter setting the location of the cache area in the storage section on the basis of the instruction from the an area instructor.

Embodiments of the present invention may include a method, apparatus, a system, a computer program, a recording medium and a data structure, for example.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

An example embodiment of the storage controller and the firmware updating method according to the present invention will be described in detail with reference to the accompanying drawings. The embodiment will be described with respect to the configuration and features or the like of the present invention by way of an exemplary disk array unit. The present invention can be effectively applied to various storage units such as hard disk units, optical disk units, and tape drive units, semiconductor storage units, as well as to disk array units.

Figure 1:
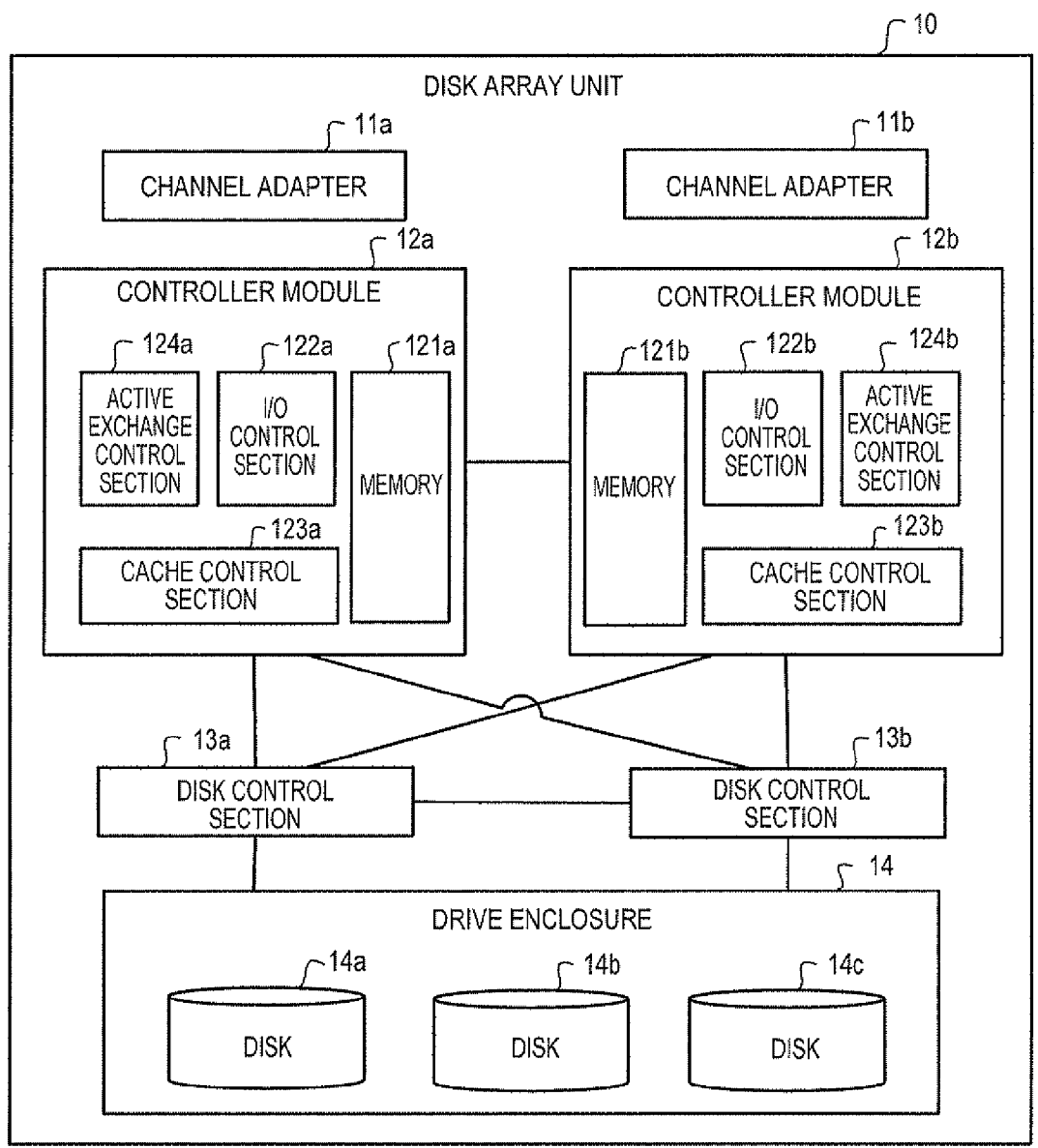
FIG. 1 illustrates a configuration of a disk array unit according to an embodiment.

An example configuration of a disk array unit 10 according to an example embodiment will first be described. FIG. 1 illustrates a configuration of the disk array unit 10 according to an example embodiment. As shown in FIG. 1, redundancy in structure is provided in the disk array unit 10, which has channel adapters 11a and 11b, controller modules (hereinafter referred to as CMs) 12a and 12b, disk control sections 13a and 13b and a drive enclosure 14. In the following description, "CM 12" is used as a general term for CMs 12a and 12b.

The channel adapter 11a is an interface for connection to a host computer or the like which exchanges inputs/outputs with the disk array unit 10. The channel adapter 11a is connected to the CM 12a. Similarly, the channel adapter 11b is an interface for connection to a host computer or the like which exchanges inputs/outputs with the disk array unit 10. The channel adapter 11b is connected to the CM 12b. The CMs 12a and 12b are control modules (storage controllers) for performing various kinds of control such as input/output control, which are connected to each other.

Each of the disk control sections 13a and 13b, which are control sections for controlling disks 14a to 14c housed in the drive enclosure 14, is connected both to the CM 12a and to the CM 12b. The drive enclosure 14 is a housing unit in which the disks 14a to 14c including a disk array are housed.

The CM 12a has a memory 121a, an I/O control section 122a, a cache control section 123a and an active exchange control section 124a. Similarly, the CM 12b has a memory 121b, an I/O control section 122b, a cache control section 123b and an active exchange control section 124b. The memory 121b, the I/O control section 122b, the cache control section 123b and the active exchange control section 124b are sections similar to the memory 121a, the I/O control section 122a, the cache control section 123a and the active exchange control section 124a and, respectively therefore, a detailed description of them is omitted.

The memory 121a is a storage section used as a firmware area used by pieces of firmware for realizing various functions of the CM 12a, and as a cache area for holding input/output data as cache data for the purpose of increasing the input/output processing speed. The I/O control section 122a is a control section which controls input/output processing according to a request transmitted from a host computer or the like through the channel adapter 11a.

The cache control section 123a is a control section which controls cache data. More specifically, control operations performed by the cache control section 123a include preparing an empty entry by invalidating old cache data in the event of a lack of an entry for storing cache data, selecting between a write-back mode and a write-through mode, writing cache data to the disks 14a to 14c when the delay time for the data becomes equal to or longer than a predetermined time during operation in the write-through mode, and performing cache data mirroring.

The write-through mode is a mode in which when a data write request is sent from a host computer or the like, write to the disks 14a to 14c is immediately performed and a notice of the completion of the write is sent back to the requester. In the write-through mode, the throughput is considerably reduced because the host computer or the like cannot obtain a response to the write request until write to the disks 14a to 14c is completed.

On the other hand, the write-back mode is a mode in which when a data write request is sent from a host computer or the like, a notice of the completion of the write is immediately sent back to the requester. Data to be sent according to the request is held as cache data in a cache area of the memory 121a and is written to the disks 14a to 14c, for example, at the end of a lapse of a predetermined time or when a lack of an entry for storing cache data occurs. In the write-back mode, the throughput is considerably improved because the host computer or the like can obtain a response to the write request without waiting for the completion of write to the disks 14a to 14c. In a case where write requests with respect to the same data occur in succession, only the data at the final request may be written to the disks 14a to 14c. As a result, the number of writes is reduced and the load on the disk array unit 10 is reduced.

Figure 2:
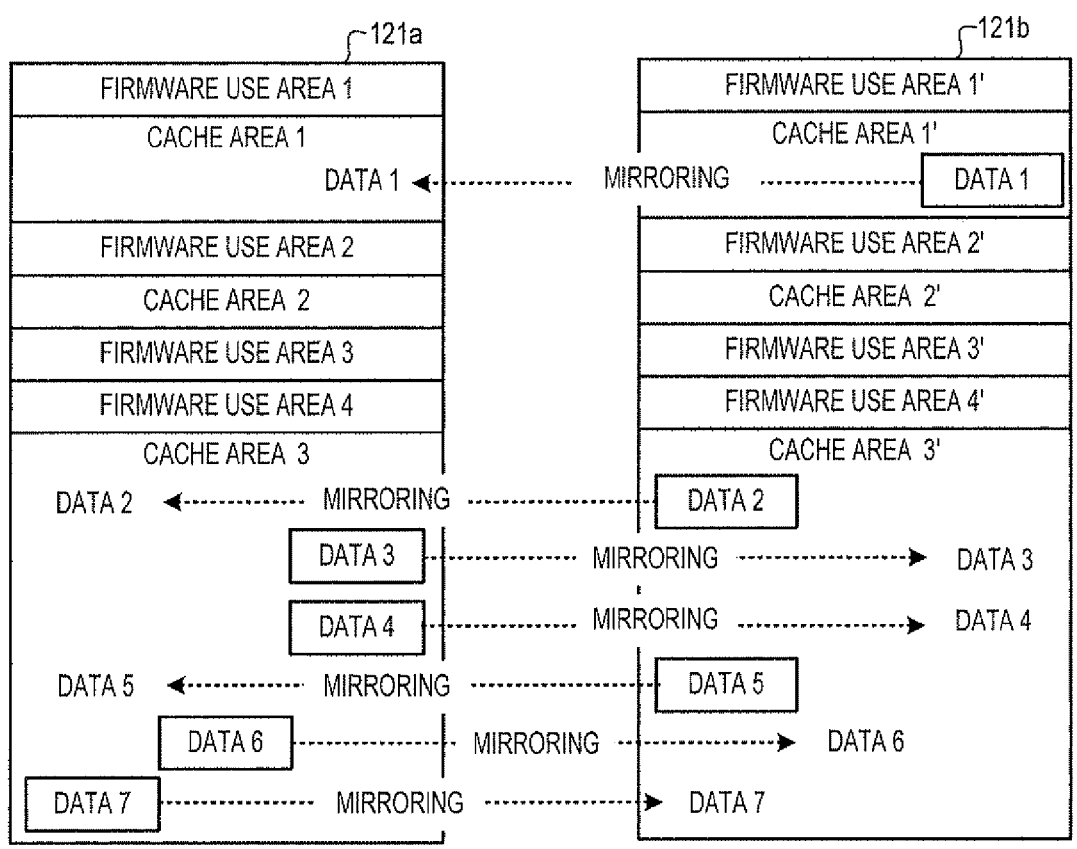
FIG. 2 illustrates cache data mirroring.

Description will be made of cache data mirroring. FIG. 2 illustrates cache data mirroring. As shown in FIG. 2, a portion of the memory 121a is used as firmware areas such as firmware areas 1 to 4, and the other portion is used as cache areas such as cache areas 1 to 3. Similarly, a portion of the memory 121b is used as firmware areas such as firmware areas 1' to 4', and the other portion is used as cache areas such as cache areas 1' to 3'.

If a version of a piece of firmware introduced into the CM 12a and a version of a piece of firmware introduced into the CM 12b are identical to each other, the offsets of the corresponding areas of the memory 121a and the memory 121b coincide with each other. For example, in the example shown in FIG. 2, the offset of cache area 1 of the memory 121a coincides with the offset of cache area 1' of the memory 121b, and the offset of firmware area 2 of the memory 121a coincides with the offset of firmware area 2' of the memory 121b.

Assuming that the offsets of areas coincide with each other as described above, the cache control sections 123a and 123b perform mirroring of data about to be written to the disks 14a to 14c (hereinafter referred to as "dirty data") during operation in the write-back mode. More specifically, each of the cache control sections 123a and 123b receiving a write request from a host computer or the like stores dirty data in a cache area in the CM to which it belongs, and copies the dirty data to the same location in the memory space of the other CM.

For example, in the example shown in FIG. 2, data 1 stored in cache area 1' of the memory 121b is copied to the same location in the memory 121a. Also, data 3 stored in cache area 3 is copied to the same location in the memory 121b. Duplicately holding a dirty cache in this way ensures that even in the event of a fault in one of the CMs, operation can be normally continued by using the dirty cache held in the other CM. If dirty data is mirrored at the same locations in the opposed memories as described above, a large amount of dirty data can be mirrored at a high speed without a need of complicated control.

Instead of mirroring to the same location in a CM counterpart, dirty caches in a pair of CMs may be mirrored to corresponding locations with different offsets set as desired.

Figure 3:
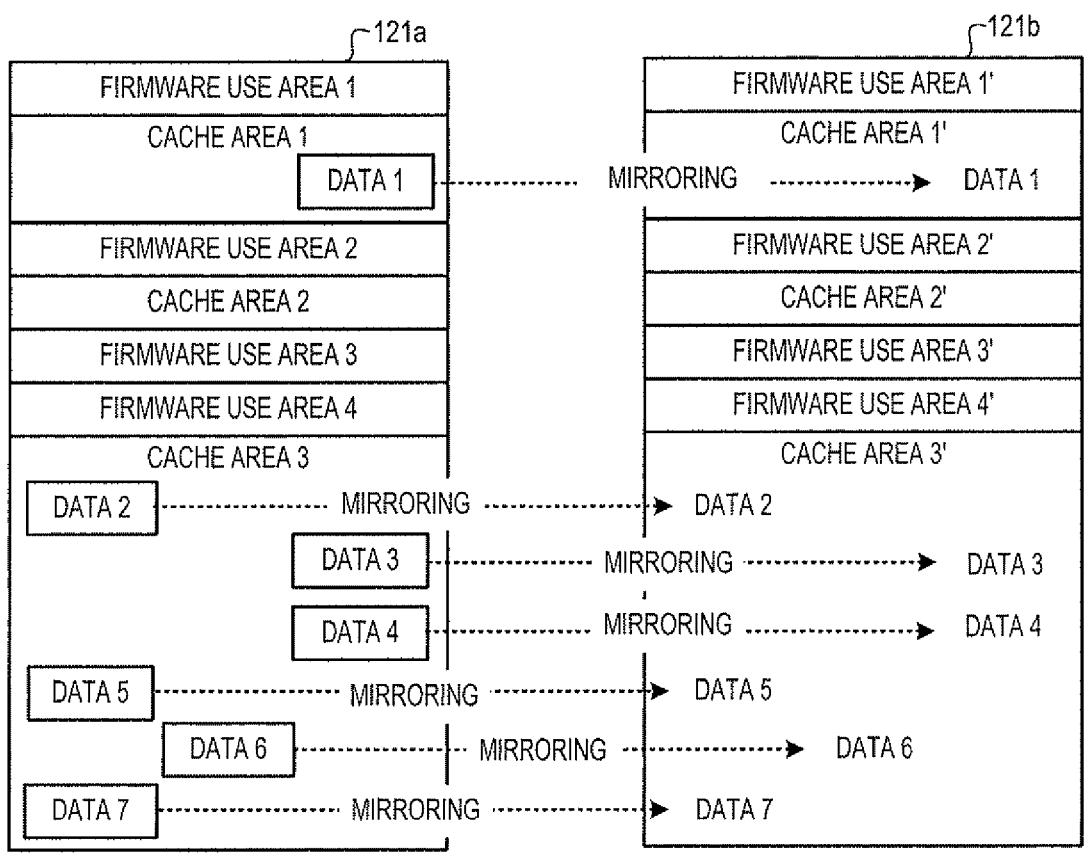
FIG. 3 illustrates mirroring after reboot of CM.

Each of the cache control sections 123a and 123b copies all dirty data held in the memory of the CM to which it belongs to the same location in the memory of the other CM when the other CM is rebooted for some reason. FIG. 3 illustrates a case where after the CM 12b has been rebooted for some reason, the cache control section 123a copies all dirty caches held in the memory 121a to the same locations in the memory 121b. Thus, even when one of the two CMs is rebooted, operation can be normally continued by transcribing dirty caches to the rebooted CM.

Referring back to FIG. 1, the active exchange control section 124a is a control section which performs control for updating firmware without stopping the operation of the disk array unit 10. Firmware updating processing is performed following a procedure of updating firmware in the CM in one line of the redundant structures in which the operation is stopped while the operation in the other line is being continued, starting the line whose firmware has been updated while stopping the operation in the other line, and updating firmware in the CM in the line in which the operation is stopped.

At the stage at which updating of the firmware in only one of the CMs is completed, the version of the firmware introduced in the CM 12a and the version of the firmware introduced in the CM 12b differ from each other. If the versions of the introduced pieces of firmware differ from each other, the area that has been used as a cache area on one of the memories may be used as a firmware area or, conversely, the area that has been used as a firmware area on one of the memories may be used as a cache area, and there is a possibility of the equality between the offsets of the areas in the memories 121a and 121b being lost.

Figure 4:
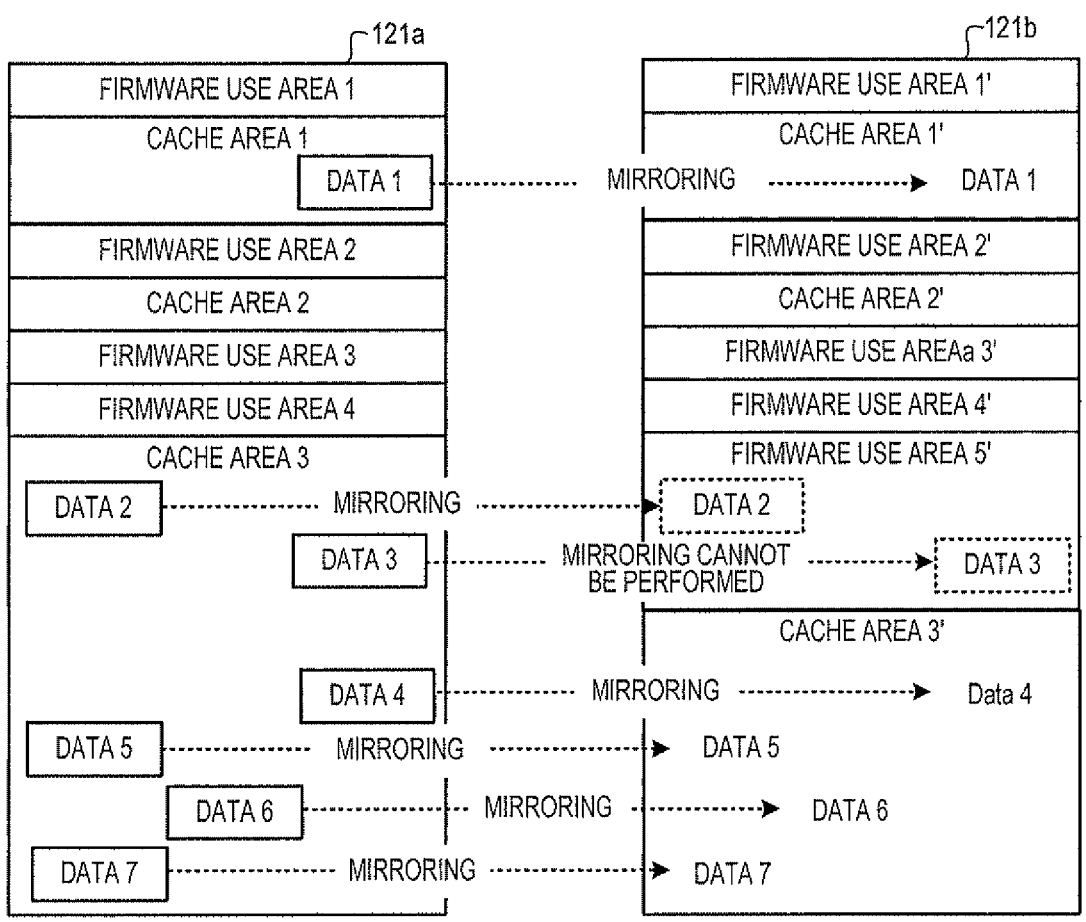
FIG. 4 illustrates an example of a case where an area which used to be a cache area is now used as a firmware area as a result of firmware update.

FIG. 4 illustrates an example of a situation where an area which used to be a cache area is now used as a firmware area as a result of firmware update. FIG. 4 shows a state at a point in time when firmware update in the CM 12b is first completed, and a portion of an area which used to be cache area 31 in the memory 121b is now used as firmware area 5'.

In this case, if the cache control section 123a performs the ordinary operation to copy all dirty data held in the memory 121a to the same location in the memory 121b after the completion of firmware update in the CM 12b and rebooting of the CM 12b, dirty data such as data 2 and data 3 would be written to firmware area 5', resulting in area destruction.

To prevent occurrence of such area destruction, according to the conventional method, a transition from the write-back mode to the write-through mode is made before the CM 12b is rebooted after the completion of firmware update in the CM 12b to avoid holding dirty data in the memory. However, this handling entails a problem in that the performance is reduced due to operation in the write-through mode.

To solve this problem, the active exchange control section 124a may temporarily stop boot-up of the CM 12b at a stage before determination of the offsets of areas in the memory 121b and a start of processing using a cache area in the memory 121b after firmware update is completed in the CM 12b and rebooting of the CM 12b is started. The active exchange control section 124a then obtains the offsets of the areas in the memory 121b.

The active exchange control section 124a performs cache area alignment on the basis of the obtained offset information. Cache area alignment is a process for resetting the offsets so that only portions used as cache areas in both the memories 121a and 121b are used as cache areas.

Figure 5:
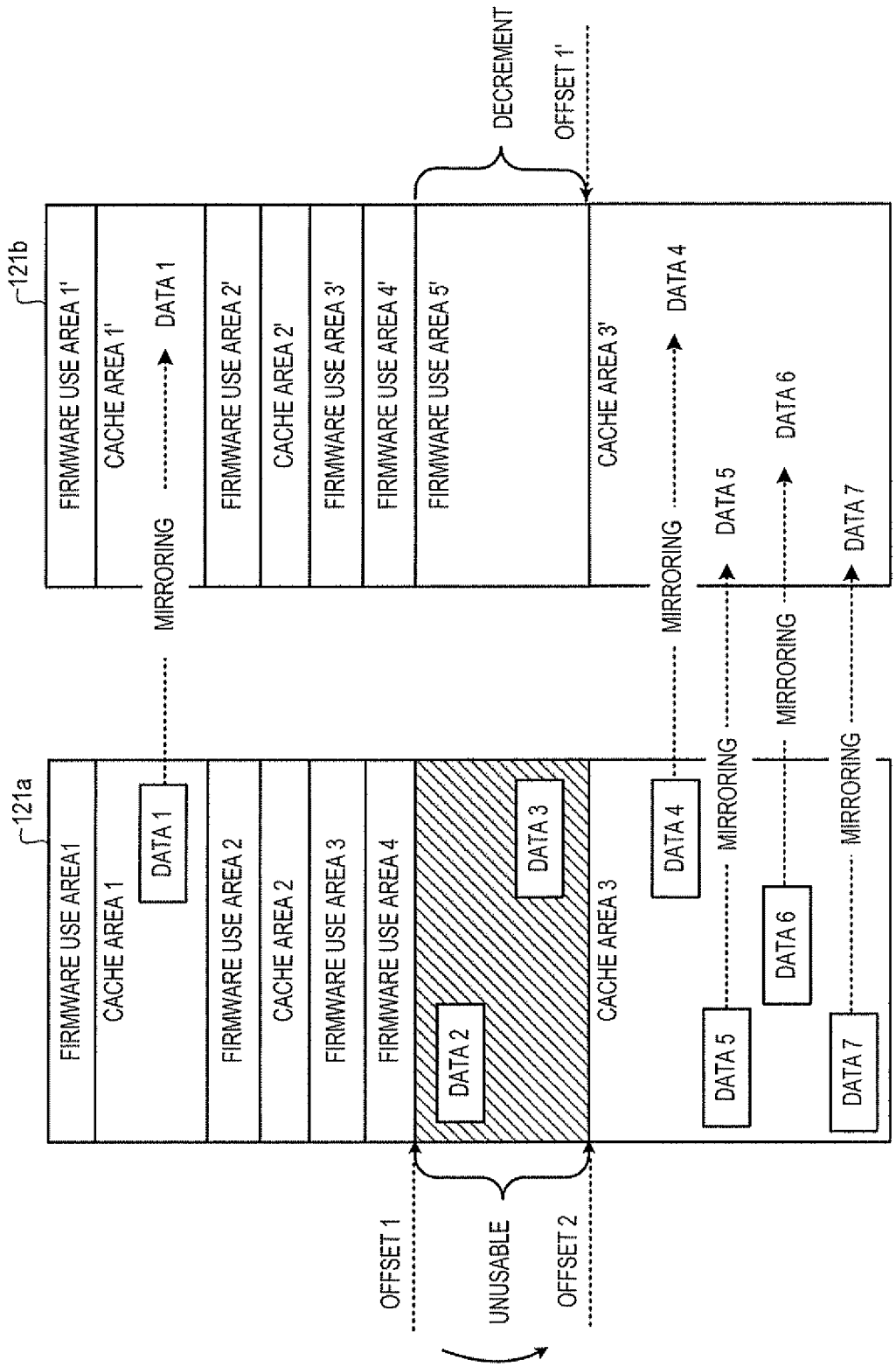
FIG. 5 illustrates an example of alignment processing in a case where an area which used to be a cache area is now used as a firmware area as a result of firmware update.

FIG. 5 illustrates an example of alignment processing in a case where an area which used to be a cache area is now used as a firmware area as a result of firmware update. FIG. 5 illustrates a case corresponding to that in FIG. 4. In this case, the active exchange control section 124a changes the start offset of cache area 3 from offset 1 before updating to offset 2 at the same location as the start offset of cache area 3' on the basis of updated offset information, and writes all dirty data (data 2 and 3 in the example shown in FIG. 5) held in the area that is no longer used as cache area 3 to disks 14a to 14c.

All the dirty data held in the area that is no longer used as cache area 3 may be moved to a valid cache area (e.g., cache area 3 higher in location relative to offset 2) instead of being written the data to the disks 14a to 14c. Moving dirty data in the memory in this way is effective in preventing a reduction in performance due to write processing.

Figure 6:
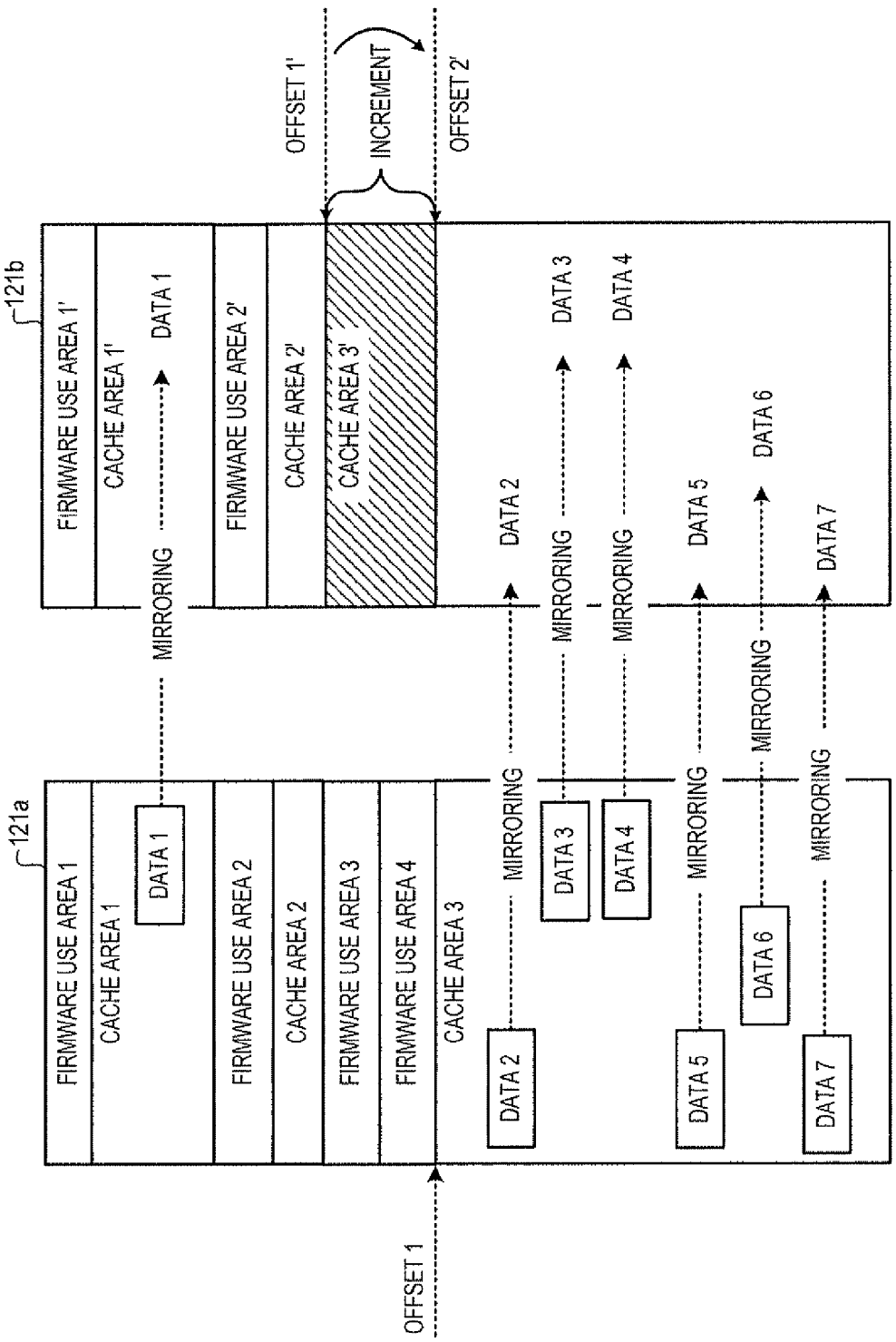
FIG. 6 illustrates an example of alignment processing in a case where an area which used to be a firmware area is now used as a cache area as a result of firmware update.

FIG. 6 illustrates an example of alignment processing in a case where an area which used to be a firmware area is now used as a cache area as a result of firmware update. A state at a point in time when firmware update in the CM 12b is first completed is illustrated. An area which used to be firmware area 3' and firmware area 4' in the memory 121b is now used as part of cache area 3'. In this case, the active exchange control section 124b changes the start offset of cache area 3' from offset 1 to offset 2' at the same location as the start offset of cache area 3 on the basis of updated offset information.

Cache area alignment is thus performed to enable mirroring of dirty data to be safely performed after the completion of boot-up of the CM 12b. Operation in the write-back mode is thus enabled even with operations on different versions of firmware in the CMs during firmware update. An area prohibited from being used as a result of cache area alignment (e.g. a hatched portion in FIG. 6) is made usable after the completion of updating of all pieces of firmware in the CM 12.

With cache areas lower in location (with smaller offsets) relative to the cache area having the offset changed (cache areas 1 and 2 in the example shown in FIG. 5), there may be an offset misalignment. Therefore, all dirty data in such cache areas may be written to the disks 14a to 14c, followed by prohibition of use of the cache areas. If priority is given to safety, use of cache areas interposed between firmware areas may be prohibited and all dirty data in such cache areas may be written to the disks 14a to 14c before firmware update is started. Also, when the CM 12 whose firmware has been updated is rebooted, the areas in the memories may be rearranged to increase continuous cache areas.

Figure 7:
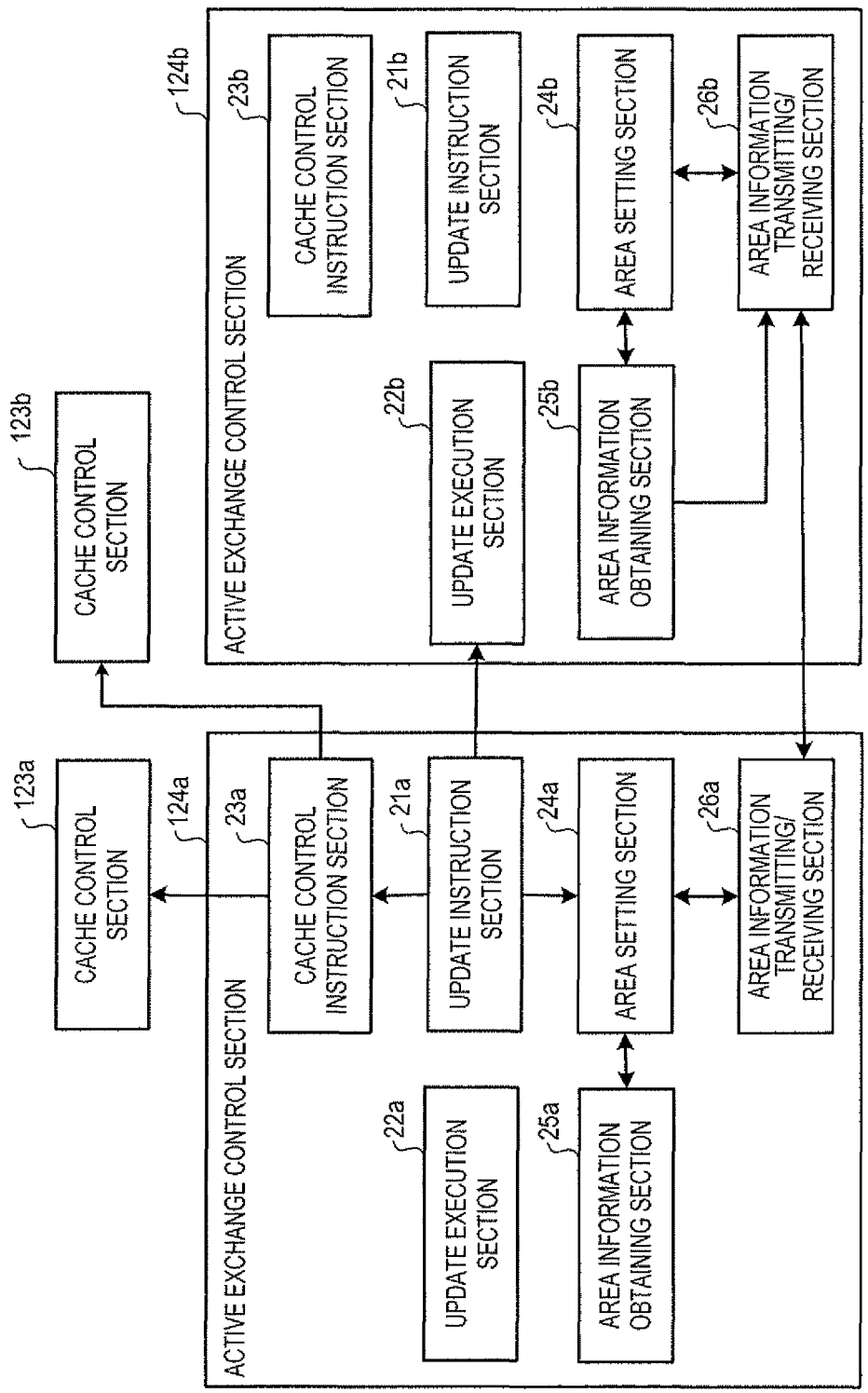
FIG. 7 illustrates a configuration of an active exchange control section.

An example configuration of the active exchange control section 124a will be described in detail. FIG. 7 illustrates a configuration of the active exchange control section 124a. As shown in FIG. 7, the active exchange control section 124a includes an update instruction section 21a, an update execution section 22a, a cache control instruction section 23a, an area setting section 24a, an area information obtaining section 25a, and an area information transmitting/receiving section 26a.

The active exchange control section 124b includes, as sections having the same functions as those of the sections in the active exchange control section 124a, an update instruction section 21b, an update execution section 22b, a cache control instruction section 23b, an area setting section 24b, an area information obtaining section 25b, and an area information transmitting/receiving section 26b. The arrows between the sections shown in FIG. 7 indicate the directions of actions when firmware update in the CM 12b is performed under the control of the active exchange control section 124a.

The update instruction section 21a is a processing section which provides instruction to perform processing necessary for updating firmware. The update instruction section 21a performs processing including instructing the update execution section 22b to update firmware in the CM 12b and instructing the CM 12b to reboot. The update execution section 22a is a processing section which executes processing for reading a predetermined file in which a piece of firmware is stored, and writing the contents of the file to a nonvolatile memory (not shown), and processing for reading out a piece of firmware from the nonvolatile memory after reboot processing, and updating the firmware by loading the firmware in the memory.

The cache control instruction section 23a controls the cache control section 123a and the cache control section 123b according to instructions from the update instruction section 21a. The cache control instruction section 23a makes each cache control section select between the write-back mode and the write-through mode and perform write-back acceleration processing for reducing the time period during which dirty data is held in the memory 121.

The area setting section 24a is a processing section which performs cache area alignment. The area setting section 24a performs cache area alignment by comparing area information on each of areas in the memory 121a obtained by instructing the area information obtaining section 25a and area information on each of areas in the memory 121b obtained through the area information transmitting/receiving section 26a. The area information obtaining section 25a is a processing section which obtains area information on each area in the memory 121a. The area information transmitting/receiving section 26a is a section which exchanges area information with the area information transmitting/receiving section 26b.

Area information is information indicating the location of an area assigned in the memory 121. In an example embodiment, the location of an area is indicated by the offset of a start location. However, the location of an area may be designated not with an offset, which is a relative value, but with an address, which is an absolute value. Area information may include information indicating the locations of a plurality of areas.

A processing procedure at the time of firmware update will be described with reference to FIGS. 8A to 8D. In the following description, the CM 12a is referred to as CM #10 and the CM 12b as CM #11.

Before firmware update is started, as shown in the figures, CM #10 is in a state of being ready for accepting an input/output request, while operated in the write-back mode and in a state of being a master of CM #11. CM #11 is also in a state of being ready for accepting an input/output request, while operated in the write-back mode and in a state of being a slave of CM #10. Each of CM #10 and CM #11 has its firmware already rewritten and is in a state of being ready for operating by the updated firmware after being rebooted.

When firmware update is started, the cache control instruction section 23a of CM #10 set as a master requests, according to an instruction from the update instruction section 21a, the cache control section 123a and the cache control section 123b to set the kind of operation at the time of write-back processing to write back acceleration processing which saves the time during which dirty data is held in the memory 121 (operation S101). As a result, write-back acceleration processing is performed by the cache control section 123a and the cache control section 123b (operations S102 and S103), and a notice of the completion of write-back acceleration processing is returned to the cache control instruction section 23a (operation S104).

As a result, if dirty data exists, CM #10 and CM #11 enter the accelerated write-back mode. In the accelerated write-back mode, dirty data is written to the disks 14a to 14c in a short time period. Therefore, the amount of dirty data held on the memory 121 is reduced. Even in a case where cache area alignment is performed and a need arises to perform processing for writing dirty data in an area to be prohibited from being used to disks 14a to 14c, write of a small amount of dirty data suffices if the write-back mode is accelerated, thus reducing the time required for writing dirty data and reducing the processing time for firmware update processing.

The update instruction section 21a starts CM #11 disconnection processing (operation S105) and transmits a disconnection control request to CM #11 (operation S106). CM #11, having received the request, performs disconnection control, stops input/output request acceptance and returns a connection control reply (operation S107). The update instruction section 21a then ends CM #11 disconnection processing (operation S108).

The update instruction section 21a transmits a reboot request to CM #11 (operation S109). CM #11 returns a reboot reply (operation S110) and starts rebooting (operation S111). By starting rebooting, the write-back mode of CM #11 is initialized and returned to the non-accelerated state.

When a communication between CM #10 and CM #11 is established during rebooting (operation S112), the update instruction section 21a starts installation first-half processing in CM #11 (operation S113) and transmits an installation first-half control request to CM #11 (operation S114). CM #11, having received the request, performs installation first-half control, causes rebooting to advance to a stage before determination of offsets of areas in the memory 121b and a start of processing using a cache area in the memory 121b, and returns an installation first-half control reply (operation S115). The update instruction section 21a then ends installation first-half processing in CM #11 (operation S116).

The cache control instruction section 23a requests, according to an instruction from the update instruction section 21a, the cache control section 123b to set the kind of operation at the time of write-back processing to write-back acceleration processing (operation S117). CM #11 sets the kind of operation at the time of write-back processing to write-back acceleration processing according to the request (operation S118) and returns a notice of the completion of the setting to the cache control instruction section 23a (operation S119). Thereafter, CM #11 operates in the accelerated write-back mode.

When the area setting section 24a requests CM #11 through the area information transmitting/receiving section 26a to compute cache areas (operation S120), the area information obtaining section 25b of CM #11 obtains area information on each area in the memory 121b and returns the area information to the area setting section 24a through the area information transmitting/receiving section 26b and the area information transmitting/receiving section 26a (operation S121).

The area setting section 24a requests, if necessary, the area setting section 24b through the area information transmitting/receiving section 26a and the area information transmitting/receiving section 26b to perform cache area alignment (operation S122), and performs cache area alignment processing by itself (operation S123). When requested to perform cache area alignment, the area setting section 24b executes cache area alignment processing (operation S124) and, after completing cache area alignment processing, returns a notice of the completion of cache area alignment processing (operation S125).

After cache area alignment has been completed in the above-described way, there is no need for writing dirty data from an unusable area to the disks and, therefore, the update instruction section 21a instructs the cache control instruction section 23a to make CM #10 and CM #11 switch from the accelerated write-back mode to the normal write-back mode (operations S126 to S129).

The update instruction section 21a starts installation second-half processing in CM #11 (operation S130) to complete boot-up of CM #11, and transmits an installation second-half control request to CM #11 (operation S131). CM #11, having received the request, performs installation second-half control, causes rebooting to advance to the end, and returns an installation second-half control reply (operation S132). The update instruction section 21a then ends installation second-half processing in CM #11 (operation S133). At this point in time, CM #11 enters a state of being ready for accepting an input/output request.

CM #11 has been ready for accepting an input/output request, and consequently, CM #10 and CM #11 are now operated by different versions of firmware. According to the present invention, however, mirroring of dirty data can be performed even in such a state to further improve the reliability of the apparatus.

After booting of CM #11 has been completed in the above-described way, the update instruction section 21a reverses the master-slave relationship to enable CM #11 to operate by the updated firmware (operations S134 to S137). Thereafter, the update instruction section 21b of CM #11 conducts a sequence of processing for updating firmware in CM #10 (operations S138 to S154).

Since the version of firmware running on CM #10 after rebooting is the same as the version of firmware running on CM #11, there is no need for cache area alignment and write-back acceleration processing in the process of rebooting CM #10. Also, since an area which has become unusable as a result of cache area alignment is made usable, the update instruction section 21b executes cache area alignment cancel processing in a stage before rebooting CM #10 to make usable the area that has become unusable as a result of cache area alignment (operation S141). In other respects, the procedure in this case is the same as the above-described procedure and the same description of the procedure will not be repeated.

The above-described processing procedure includes no procedure for making the CM 12 switch to the write-through mode. That is, the firmware updating method according to an example embodiment enables nonstop update of firmware while maintaining the CM 12 in the write-back mode and enables prevention of a considerable reduction in performance during firmware update.

An example of a processing procedure for cache area alignment processing will be described with reference to FIGS. 9A and 9B. The description will be described by assuming that dirty data held in cache areas other than the uppermost cache areas has already been written to the disks 14a to 14c; only the uppermost cache areas are valid; and cache area alignment is performed by aligning the start offsets of the uppermost cache areas, and that if an unusable area is produced as a result of cache area alignment, dirty data held in the area is not written to the disks 14a to 14c but moved into a valid cache area. In the following description, the CM 12 controlling firmware update is referred to as "main CM" and the CM in which firmware is updated is referred to as "sub CM".

Figure 9A:
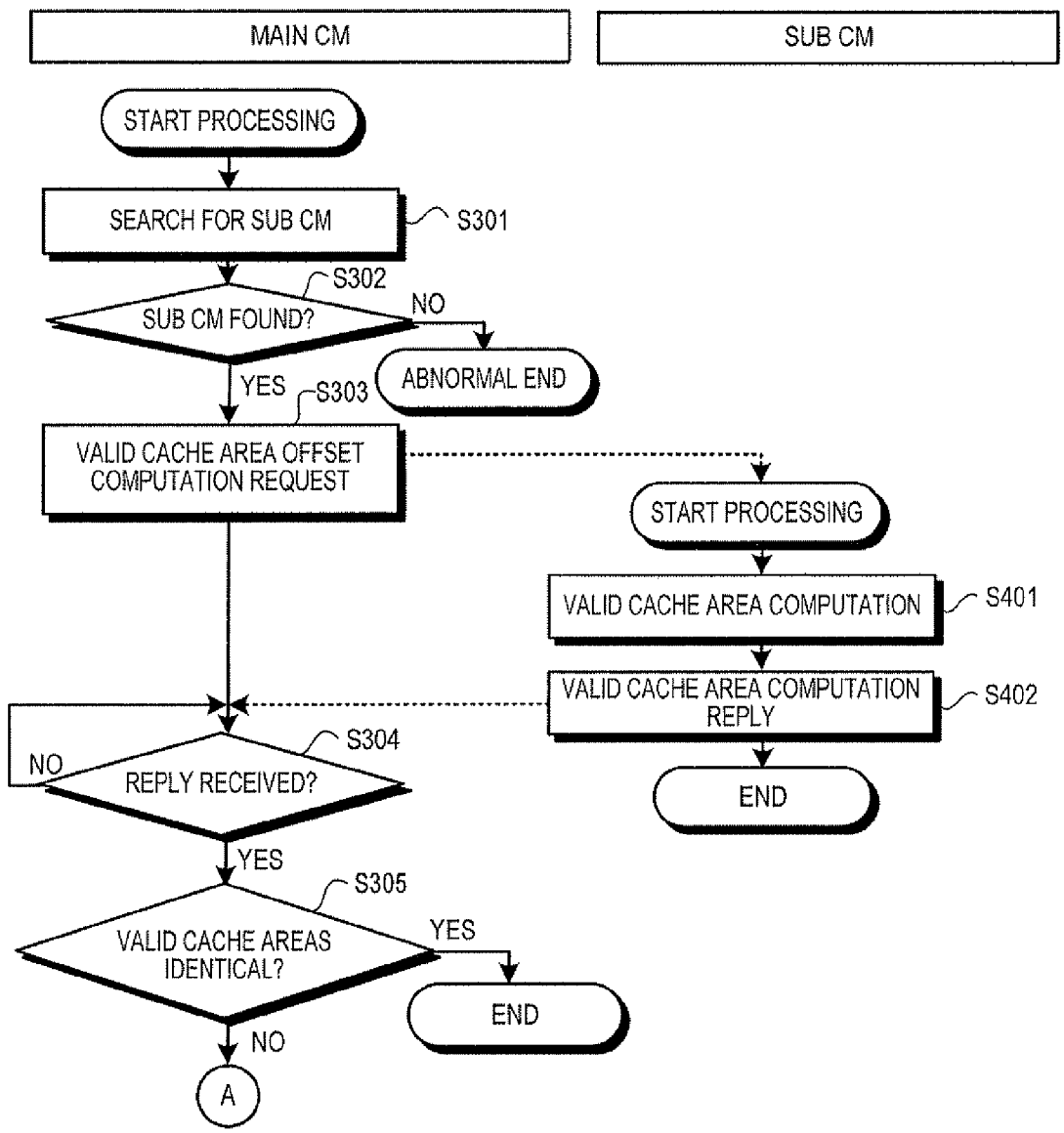
FIGS. 9A and 9B illustrate an example of a processing procedure for cache area alignment processing.
Figure 9B:
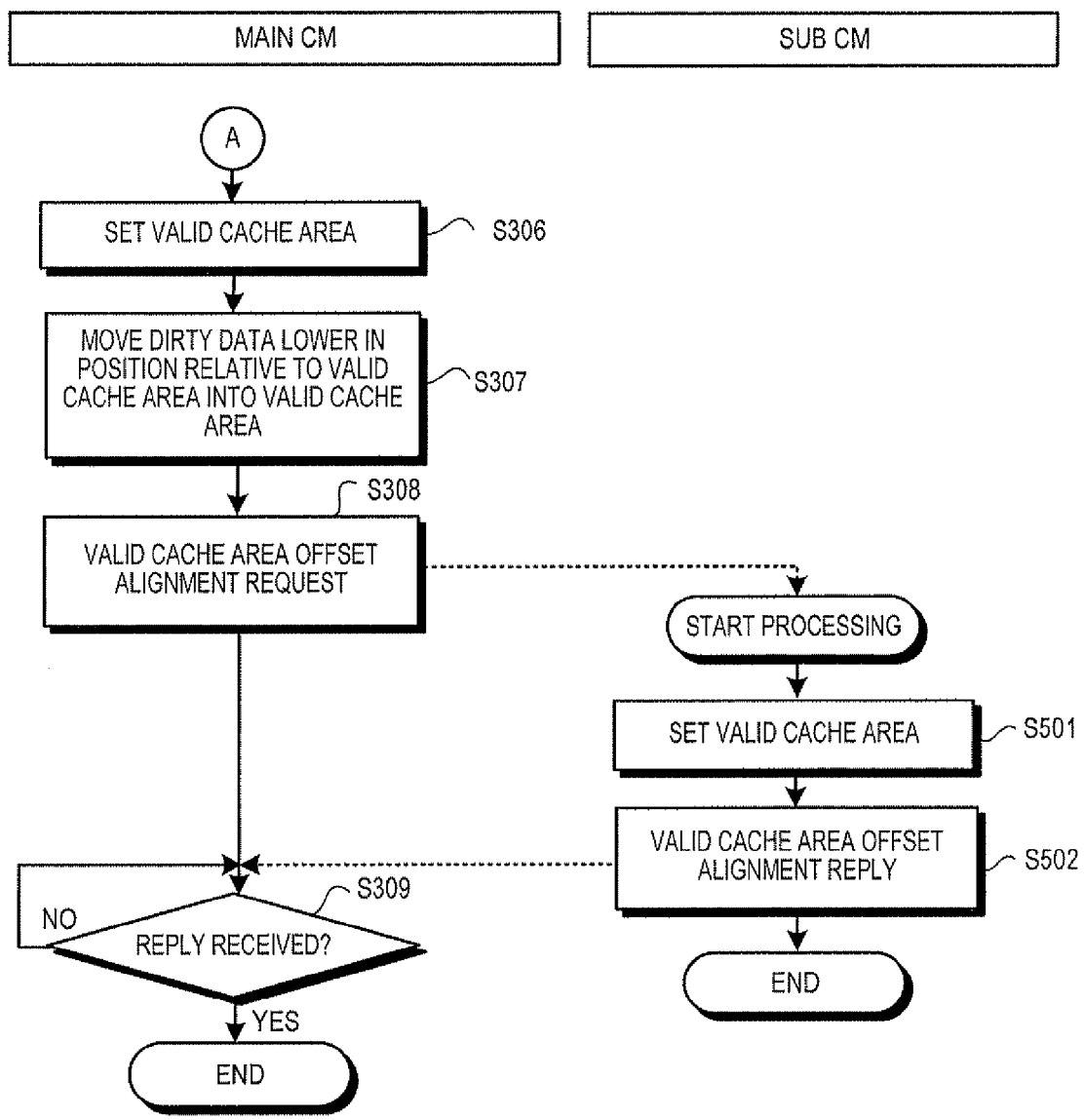

As shown in FIGS. 9A and 9B, the main CM searches for the sub CM (operation S301) and ends processing in an abnormal ending manner if the sub SM is not found (No in operation S302). If the sub SM is found (Yes in operation S302), the area setting section 24 of the main CM requests, through the area information transmitting/receiving section 26, the sub CM to compute the offset of a valid cache area (operation S303).

The area information obtaining section 25 of the sub CM, having received the request, computes the offset of the valid cache area in the CM to which it belongs (operation S401) and returns the computed offset to the main CM through the area information transmitting/receiving section 26 (operation S402).

When the area setting section 24 of the main CM receives the reply (Yes in operation S304), it compares the offset of the valid cache area in the CM to which it belongs obtained by the area information obtaining section 25 and the offset of the valid cache area of the sub CM in the reply. If the offsets are equal to each other (Yes in operation S305), there is not need to perform cache area alignment and the process ends.

If the offsets are not equal to each other (No in operation S305), the area setting section 24 of the main CM sets the valid cache area so that the offset corresponding to the higher location becomes a start offset (operation S306), thereby moving dirty data lower in location relative to the valid cache area into a valid area, i.e., an area higher in location relative to the start offset set in operation S306 (operation S307).

The area setting section 24 of the main CM then transmits the start offset set in operation S306 to the sub CM through the area information transmitting/receiving section 26 and makes a request for alignment of the offset of the valid cache area (operation S308).

The area setting section 24 of the sub CM, having received the request, sets the valid cache area so that the designated offset becomes a start offset (operation S501) and returns a notice of the setting of the valid cache area to the main CM through the area information transmitting/receiving section 26 (operation S502). When the area setting section 24 of the main CM receives the reply (Yes in operation S309), it ends the process.

Figure 8A:
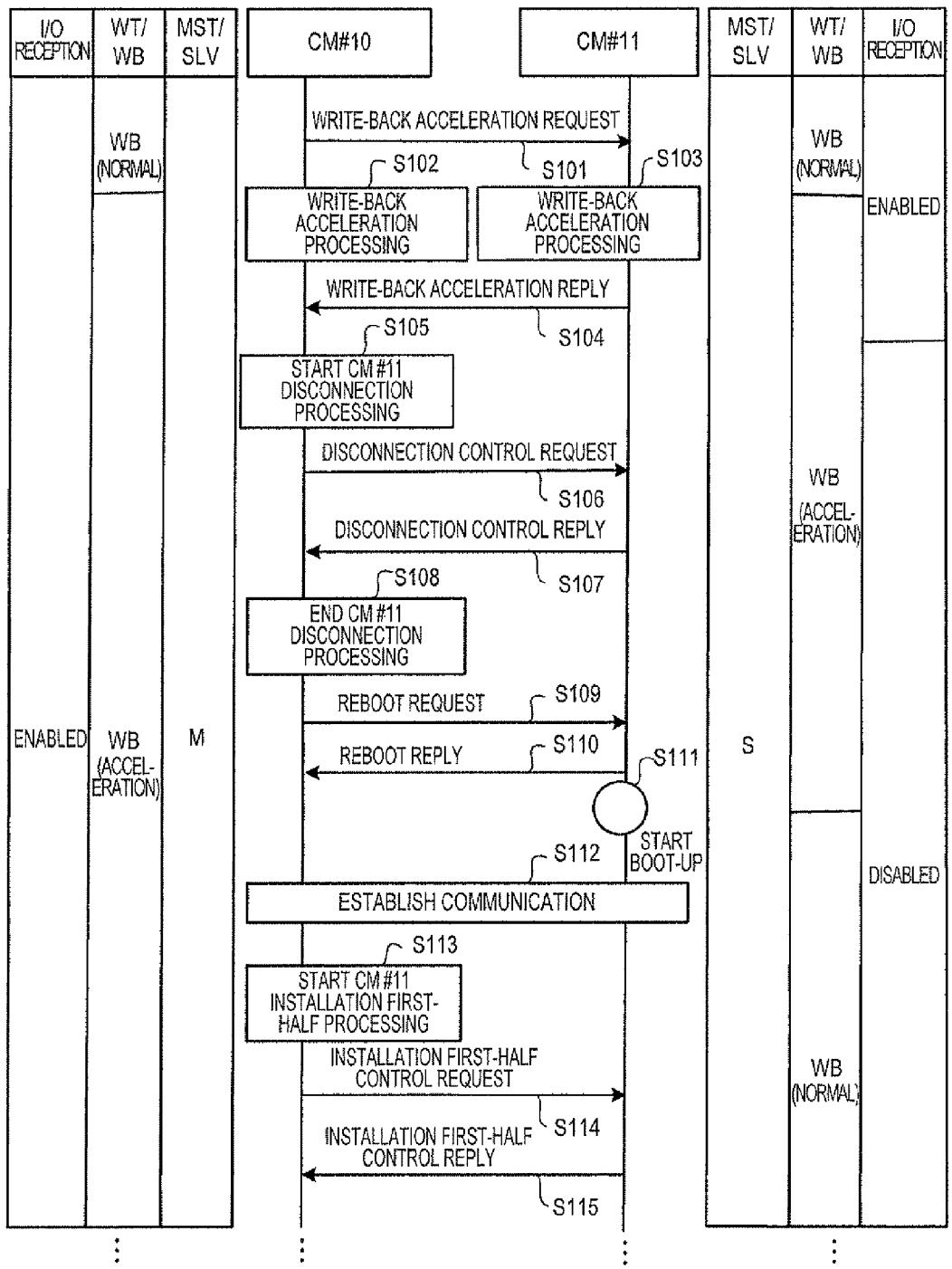
FIGS. 8A to 8D illustrate a processing procedure at the time of firmware update.
Figure 8B:
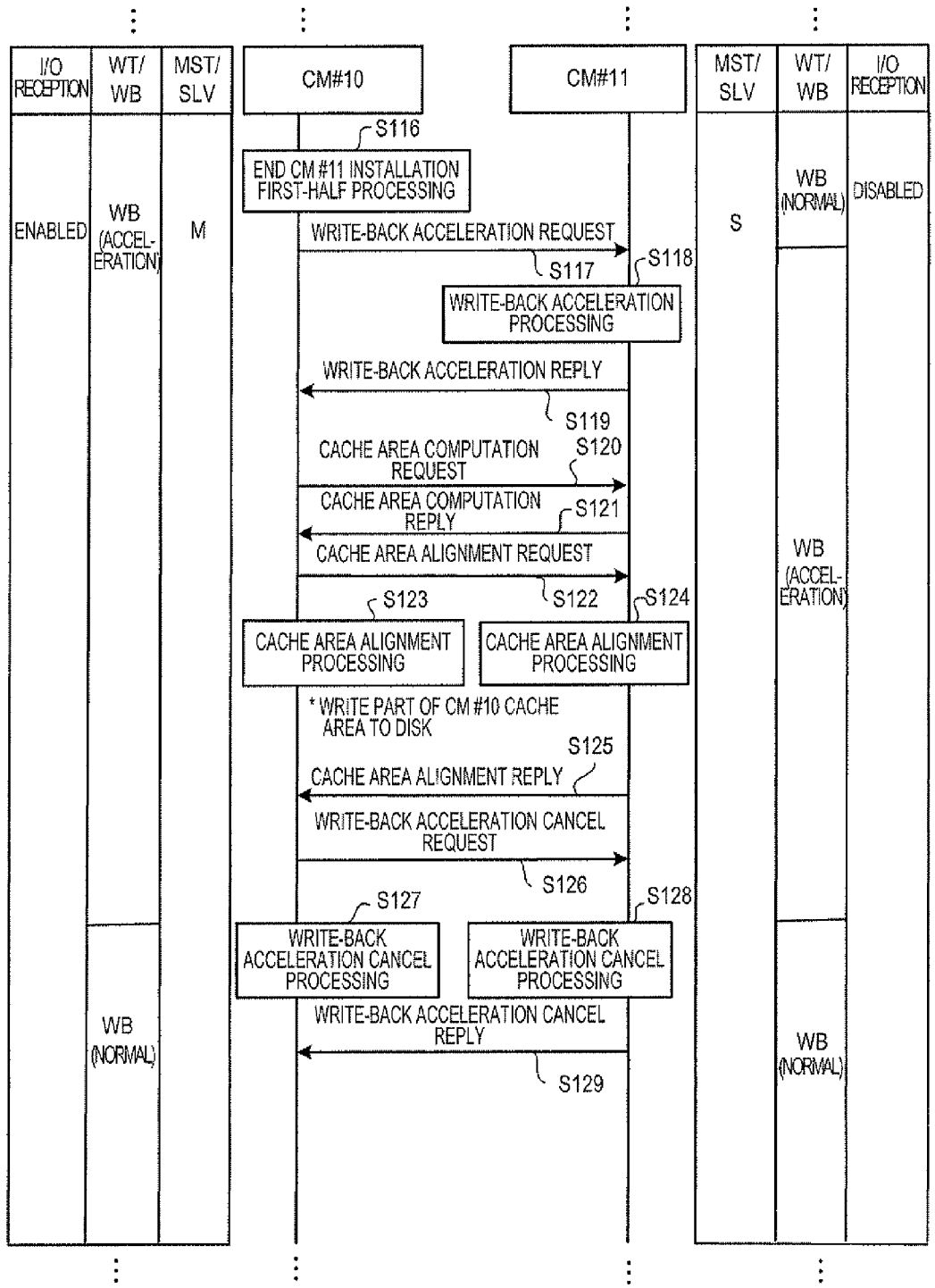
Figure 8C:
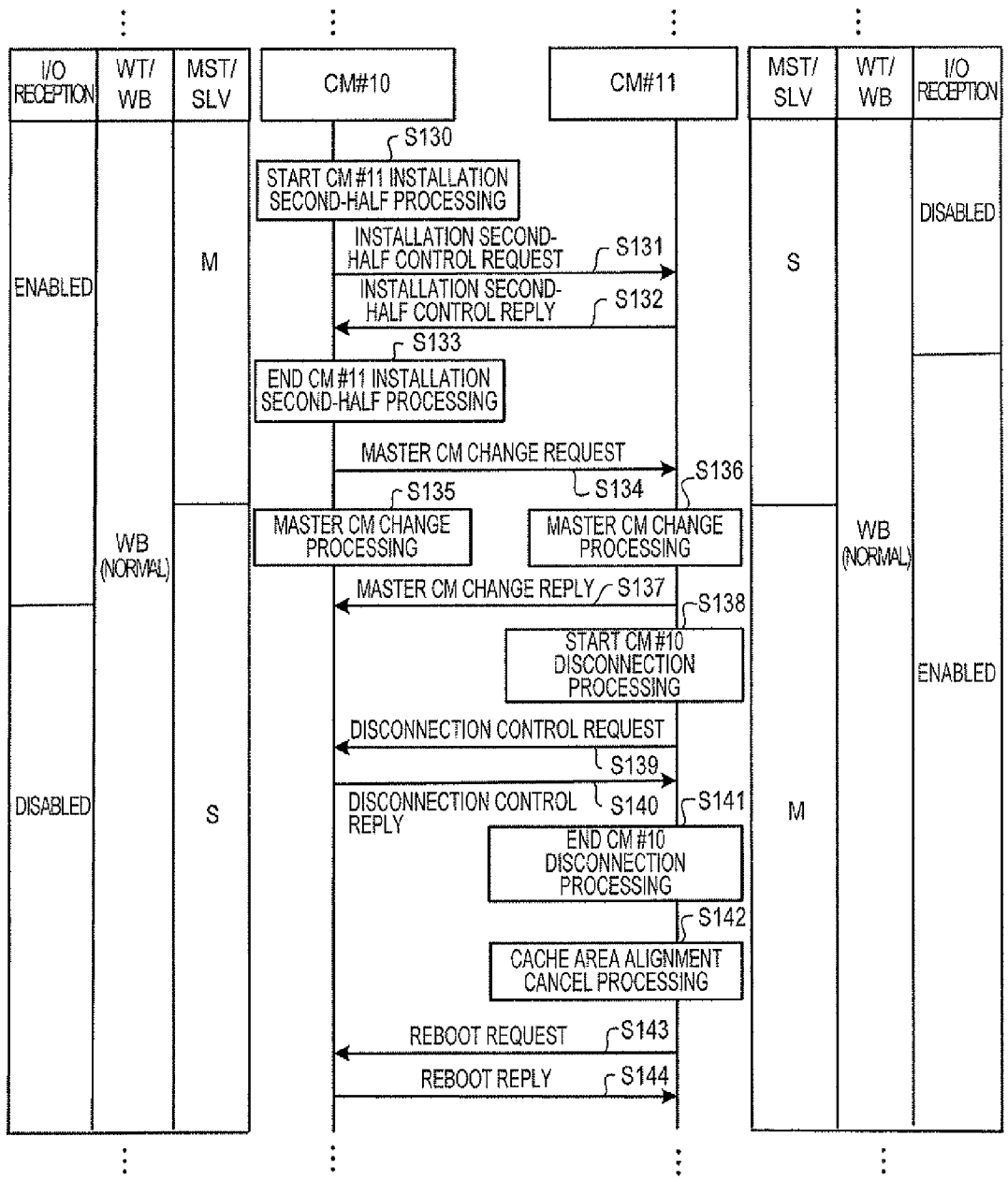
Figure 8D:
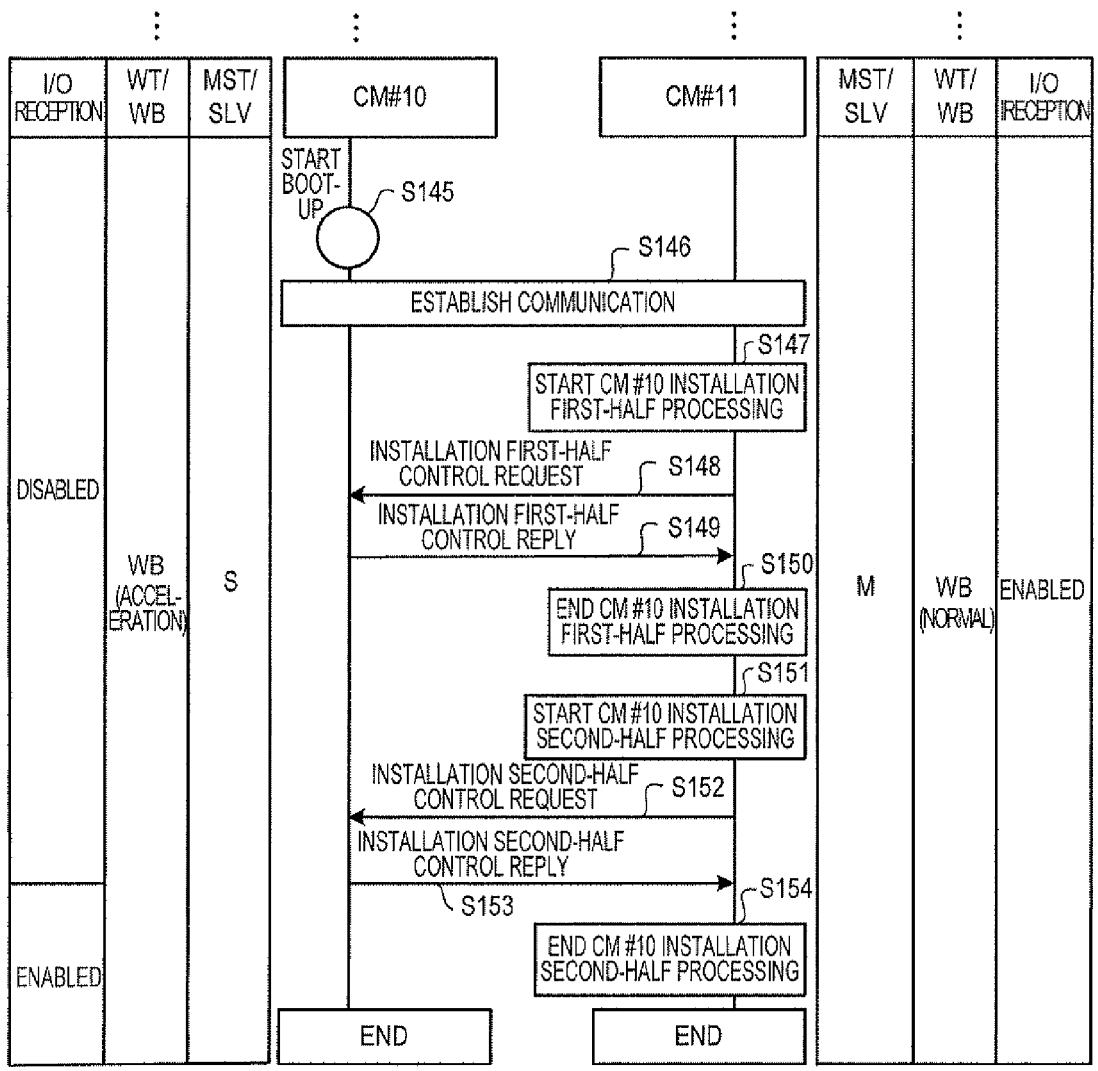

The processing procedure shown in FIGS. 9A and 9B corresponds to operations S120 to S125 in the processing procedure shown in FIG. 8B.

An example of a processing procedure for cache area alignment cancel processing will be described with reference to FIG. 10. The example of a processing procedure for cache area alignment cancel processing described below corresponds to the cache area alignment processing shown in FIGS. 9A and 9B. It is assumed that cache area alignment cancel processing is executed at a point in time before the main CM on which firmware is running after being updated reboots the sub CM on which firmware before updating is running, as in the processing procedure shown in FIG. 8C.

Figure 10:
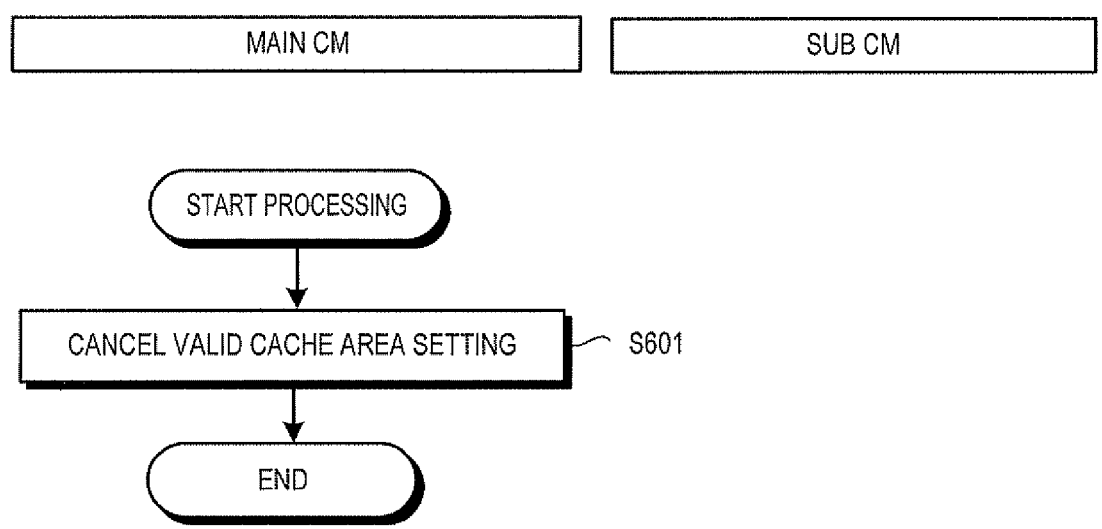
FIG. 10 illustrates an example of a processing procedure for cache area alignment cancel processing.

As shown in FIG. 10, the area setting section 24 of the main CM cancels the setting of the valid cache area to make all the cache areas usable (operation S601). The areas in the memory 121 of the sub CM coincide in offset to those in the memory 121 of the main CM because the version of firmware operating on the sub CM as a result of rebooting is identical to the version of firmware operating on the main CM.

In an example embodiment, as described above, cache area alignment is performed at the time of firmware update, so that mirroring of caches can be normally executed even during firmware update. Also, the storage unit is thereby enabled to operate in the write-back mode with safety even during firmware update, thus enabling prevention of degradation in the performance of the storage unit during firmware update.

While example embodiments of the present invention have been described as an example of an application of the present invention to a storage unit having two CMs. The present invention can also be applied effectively to a storage unit having three or more CMs.

Performing cache area alignment as in the firmware updating method according to present embodiment is also effective in updating firmware by making a transition to the write-through mode. A processing procedure for firmware update in the case of making a transition to the write-through mode will be described with reference to FIGS. 11A to 11F.

Figure 11A:
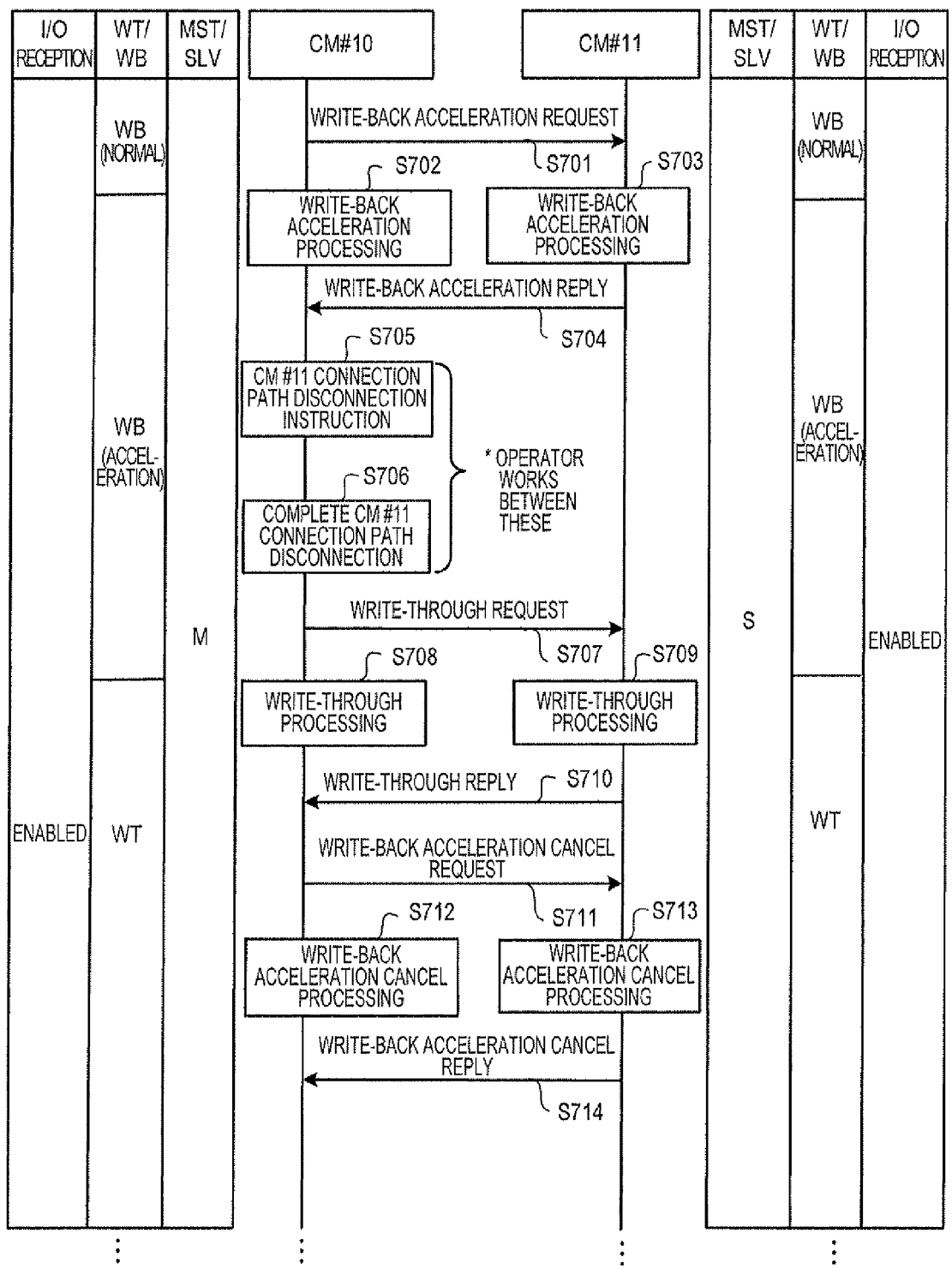
FIGS. 11A to 11F illustrate a processing procedure at the time of firmware update in the case of making a transition to a write-through mode.
Figure 11B:
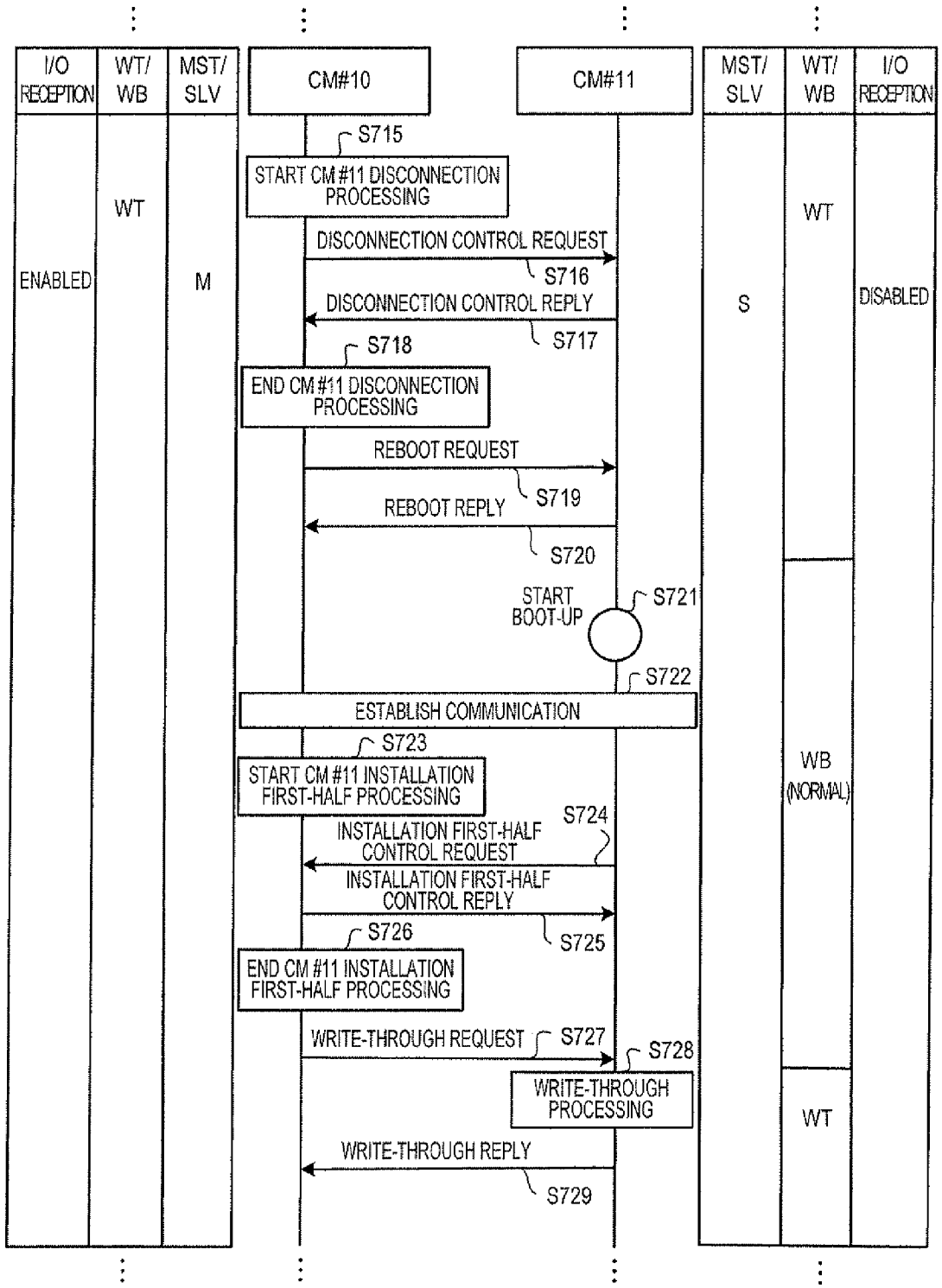
Figure 11C:
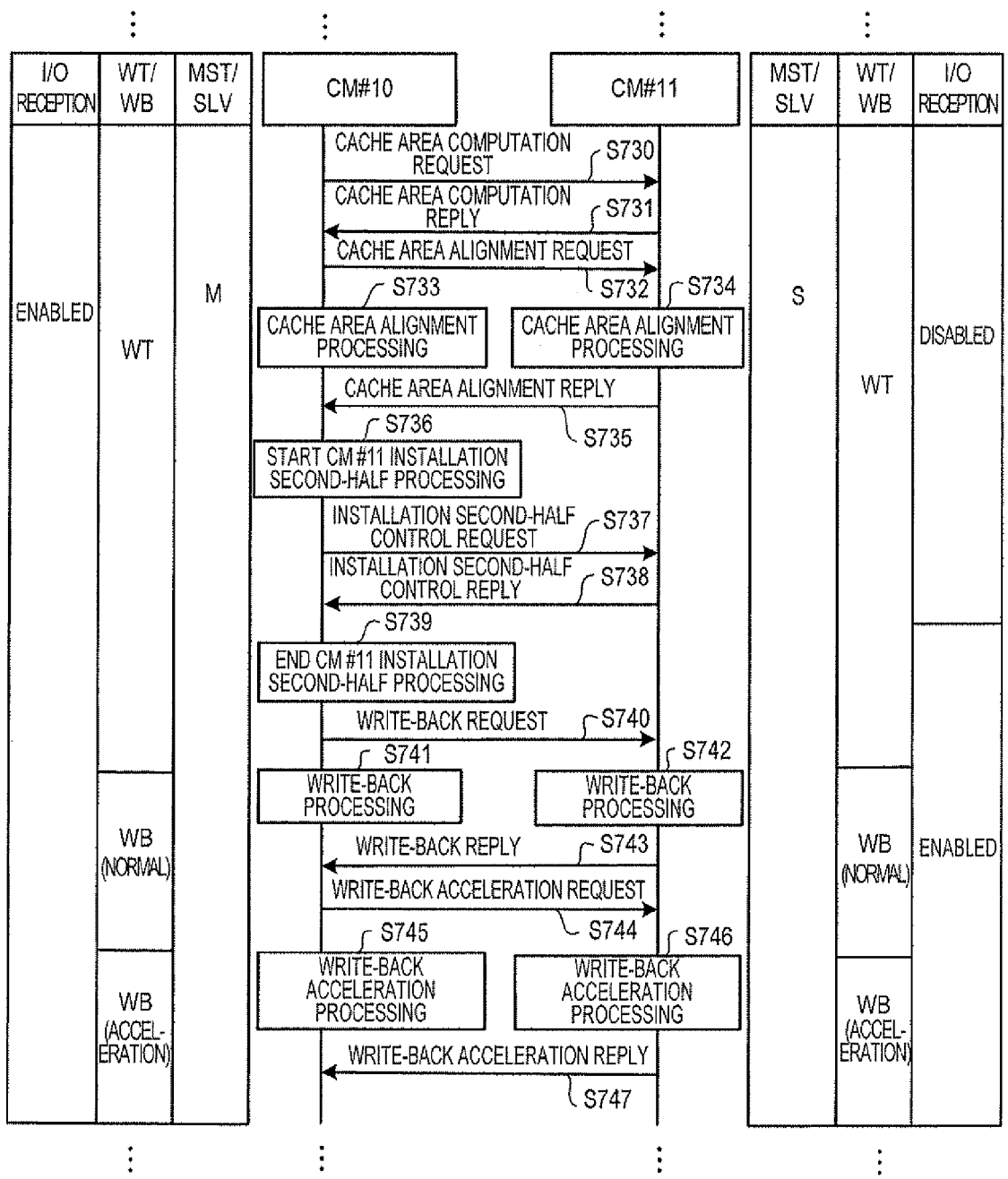
Figure 11D:
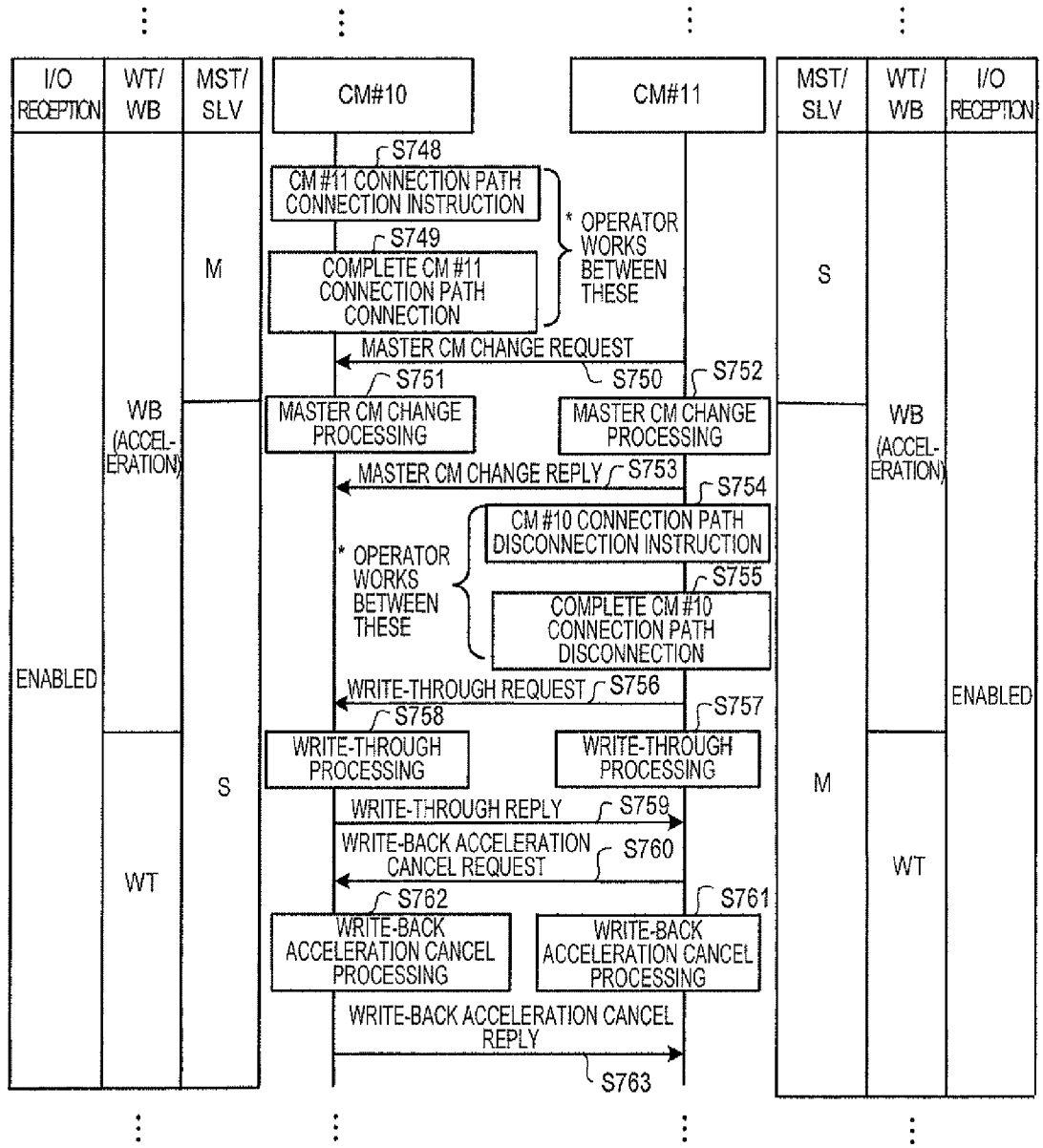
Figure 11E:
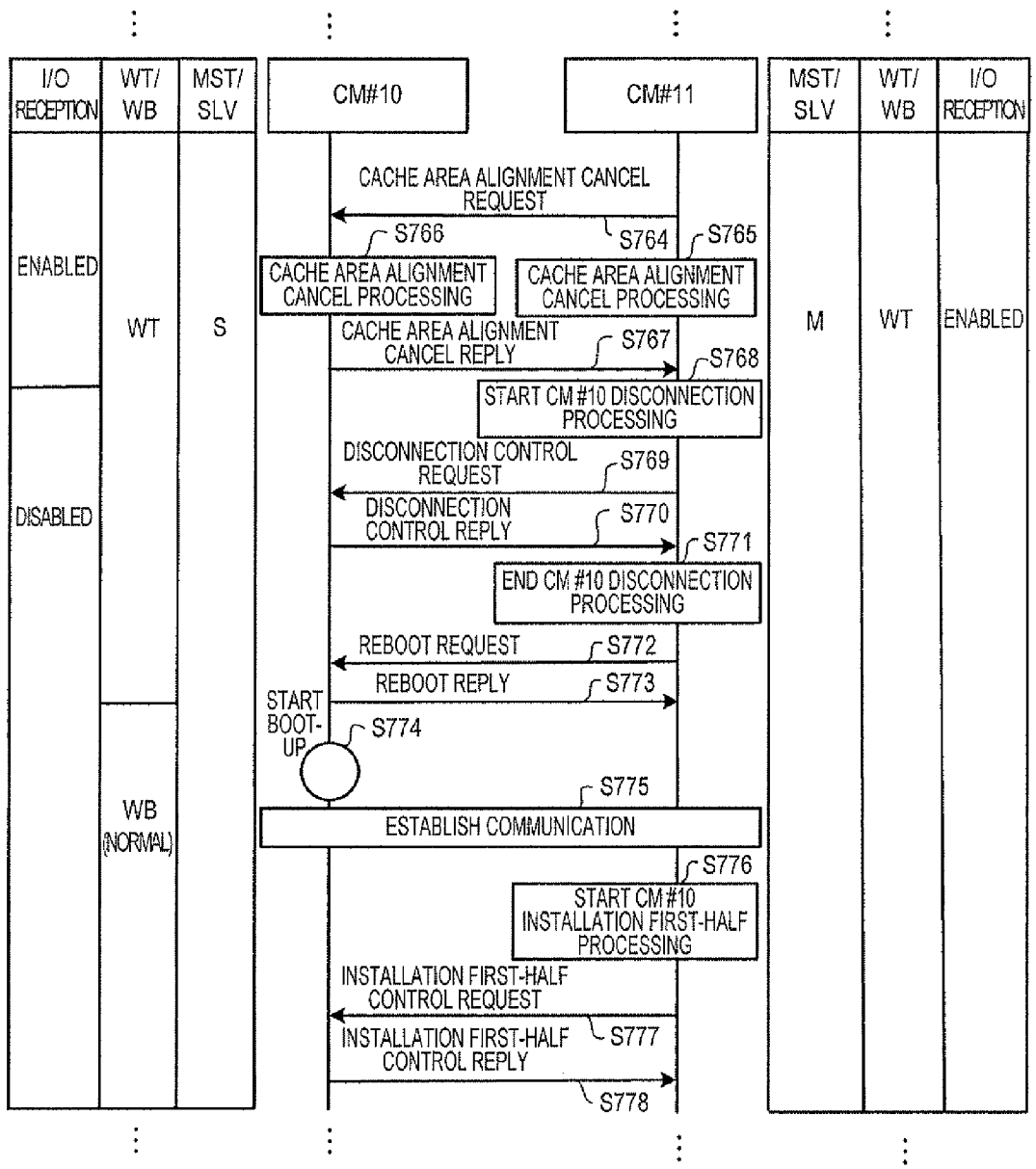
Figure 11F:
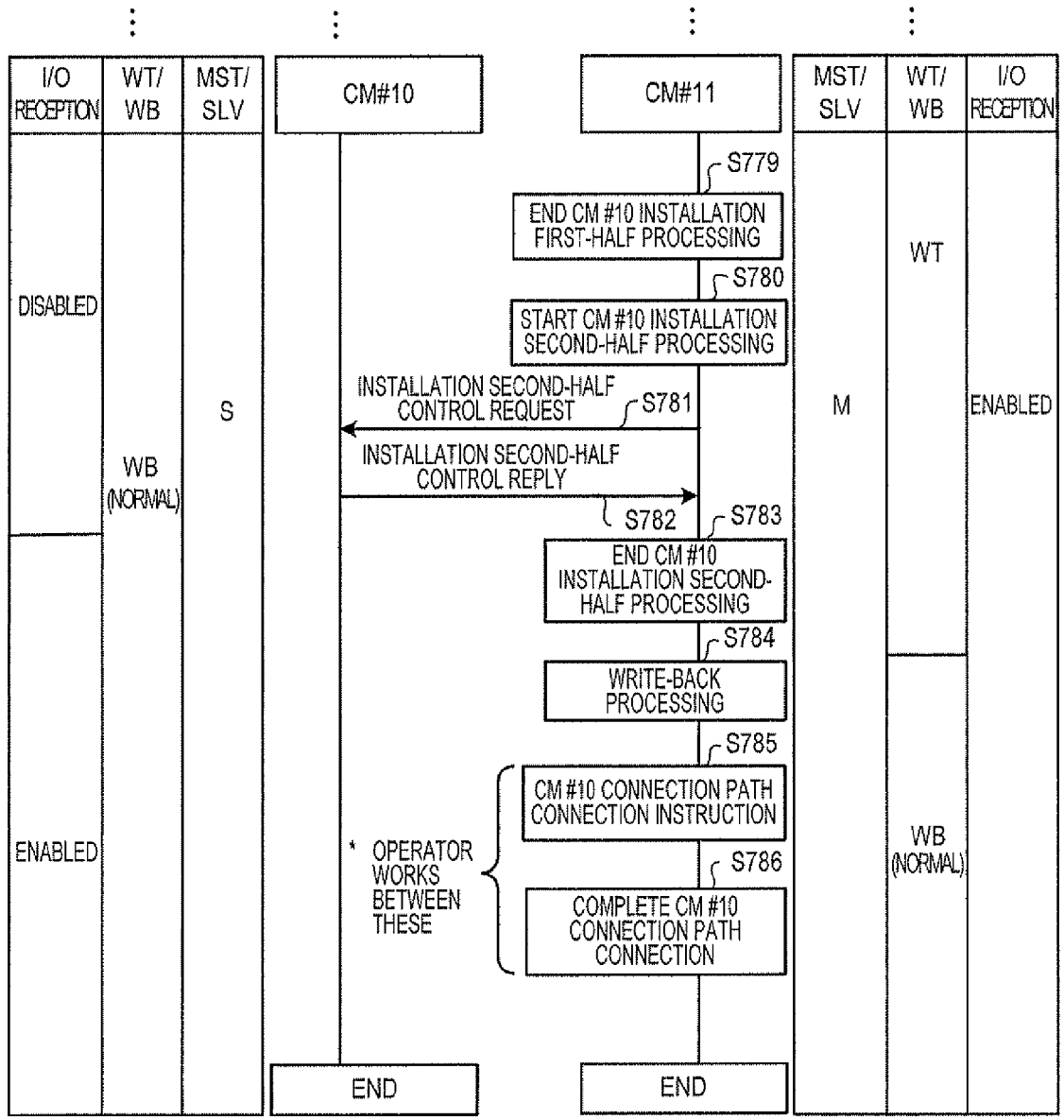

As shown in FIG. 11A, CM #10 conducts the operations of CM #10 and CM #11 in the accelerated write-back mode in order to reduce the amount of dirty data written to the disks 14a to 14c at the time of transition to the write-through mode (operations S701 to S704). An operator disconnects the connection path to CM #11 to inhibit a host computer or the like from accessing CM #11 (operations S705 to S706).

Subsequently, CM #10 makes itself and CM #11 switch to the write-through mode (operations S707 to S710) and resets to an initial value the time period during which dirty data is held in the memory 121 in the write-back mode (operations S711 to S714). CM #10 then disconnects CM #11 (operations S715 to S718) and makes CM #11 reboot (operations S719 to S721).

When a communication is established between CM #10 and CM #11 in the course of rebooting (operation S722), CM #10 temporarily stops boot-up of CM #11 at a stage before the offsets of areas on the memories are determined and before processing operations using cache areas in the memories are started (operations S723 to S726), and makes CM #11 operating in the write-back mode by rebooting switch to the write-through mode (operations S727 to S729).

CM #10 then performs cache area alignment (operations S730 to S735). At this point in time, each CM is operating in the write-through mode, so that no dirty data is held on the memories. CM #10 makes CM #11 complete boot-up (operations S736 to S739) and thereafter makes itself and CM #11 switch to the write-back mode (operations S740 to S743) to make itself and CM #11 operate in the accelerated write-back mode (operations S744 to S747).

Thereafter, the operator connects the connection path to CM #11 to enable the host computer or the like to access CM #11 (operations S748 to S749). After completing CM #11 firmware update processing in the above-described way, CM #10 changes CM #11 into the master in order to update firmware in itself (operations S750 to S753). The operator then disconnects the connection path to CM #10 to inhibit the host computer or the like from accessing CM #10 (operations S754 to S755).

The procedure from operations S748 to S755 includes a number of operations in which the operator participates. A great part of the time required for updating firmware is thought to be occupied with these operations of the procedure the procedure in these operations. Making CM #10 and CM #11 switch to the write-back mode in the above-described operations S740 to S743 is performed for the purpose of preventing degradation in performance during the above-described long time period required to execute the procedure. At this stage, since cache area alignment has already been completed, mirroring of dirty data can be performed with safety between the CMs to prevent loss of dirty data.

Processing for updating firmware in CM #10 by CM #11 may be performed (operations S756 to S786) by the same procedure as that described above. The description of the same procedure will not be repeated.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing an example embodiments may be recorded on computer-readable media comprising computer-readable recording media. The program/software implementing an example embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of an example embodiments, any combinations of the described features, functions and/or operations can be provided.

The many features and advantages of an example embodiments are apparent from the detailed specification and, thus, it is intended by the appended claims to cover all such features and advantages of an example embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An apparatus comprising:
a first controller module that includes a first memory and a first processor; and
a second controller module that includes a second memory and a second processor, wherein
the first processor executes a process including:
sending an update instruction to the second processor to update firmware in the second memory, and
requesting the second processor to transmit area information indicating a location of a cache area in the second memory in which a cache is held, when updating of the firmware in the second memory is completed, and
providing an instruction to reset the location of the cache area based on the area information, and
the second processor executes a process including:
obtaining area information indicating the location of the cache area in the second memory according to the request from the first processor,
transmitting the area information to the first processor, and
resetting the location of the cache area in the second memory based on the instruction to reset provided by the first processor.

2. The apparatus according to claim 1, wherein the second processor transmits a start address of the cache area in the second memory as the area information.

3. The apparatus according to claim 1, wherein
when updating of the firmware in the second memory is completed and the location of the cache area in the second memory has been reset,
the first processor restores the location of the cache area in the second memory to a location before being reset.

4. The apparatus according to claim 1, wherein
if cached data exists outside of the location of the cache area in the second memory that was reset,
said cached data that exist outside the location is moved into the cache area in the second memory.

5. The apparatus according to claim 1, further comprising a storage device for storing data, wherein if cached data exists outside the location of the cache area in the second memory reset by the second processor, the cached data is moved into the storage device.

6. An apparatus comprising:
a first controller module that includes a first memory and a first processor; and
a second controller module that includes a second memory and a second processor, wherein
the first processor executes a process including:
sending an update instruction to the second processor to update firmware in the second memory, and requesting the second processor to transmit area information indicating a location of a cache area in the second memory in which a cache is held, when updating of the firmware in the second memory is completed, and the second processor executes a process including:
obtaining area information indicating the location of the cache area in the second memory according to the request from the first processor, and
transmitting the area information to the first processor, wherein
the first processor provides an instruction to reset the location of the cache area in the second memory based on the transmitted area information when the location of the cache area indicated by the transmitted area information and a location of a cache area in the first memory differ from each other, and does not provide the instruction to reset when the location of the cache area indicated by the transmitted area information and the location of the cache area in the first memory do not differ from each other, and
when the first processor provides the instruction to reset, the second processor resets the location of the cache area in the second memory based on the provided instruction to reset.

7. A method for use with a first controller module that includes a first memory and a first processor and a second controller module that includes a second memory and a second processor, the method comprising:
sending an update instruction by the first processor to the second processor to update firmware in the second memory;

requesting, by the first processor, the second processor to transmit area information indicating a location of a cache area in the second memory in which a cache is held, when updating of the firmware in the second memory is completed,
in response to the request to transmit area information,
obtaining, by the second processor, area information indicating the location of the cache area in the second memory, and
transmitting the area information by the second processor, to the first processor;
providing, by the first processor, an instruction to reset the location of the cache area in the second memory based on the transmitted area information; and
resetting, by the second processor, the location of the cache area in the second memory according to the provided instruction to reset the location.

8. The method according to claim 7, wherein, in said transmitting, a start address of the cache area in the second memory is transmitted as the area information.

9. The method according to claim 7, further comprising:
when updating of the firmware in the second memory is completed, restoring the reset location of the cache area in the second memory to a location before the resetting.

10. The method according to claim 7, further comprising:
if cached data exists outside the reset location, moving the cached data into the cache area.

11. The method according to claim 7, further comprising:
if cached data exists outside the reset location, moving the data into a storage device other than the first memory or the second memory.

* * * * *

UNITED STATES PATENT AND TRADEMARK OFFICE
CERTIFICATE OF CORRECTION

PATENT NO. : 8,612,675 B2  Page 1 of 1
APPLICATION NO. : 12/198740
DATED : December 17, 2013
INVENTOR(S) : Tadashi Matsumura et al.

It is certified that error appears in the above-identified patent and that said Letters Patent is hereby corrected as shown below:

In the Claims:

In Column 12, Line 24, In Claim 1, after "memory," delete "and".

Signed and Sealed this
Twenty-fifth Day of March, 2014

Michelle K. Lee
*Deputy Director of the United States Patent and Trademark Office*